US007523293B2

(12) United States Patent
Vishkin

(10) Patent No.: US 7,523,293 B2
(45) Date of Patent: *Apr. 21, 2009

(54) SPAWN-JOIN INSTRUCTION SET ARCHITECTURE FOR PROVIDING EXPLICIT MULTITHREADING

(76) Inventor: Uzi Y. Vishkin, 2 Dundee Ct., Rockville, MD (US) 20850

( * ) Notice: Subject to any disclaimer, the term of this patent is extended or adjusted under 35 U.S.C. 154(b) by 0 days.

This patent is subject to a terminal disclaimer.

(21) Appl. No.: 10/236,934

(22) Filed: Sep. 9, 2002

(65) Prior Publication Data
US 2003/0088756 A1    May 8, 2003

Related U.S. Application Data

(63) Continuation of application No. 09/380,571, filed on Sep. 7, 1999, now Pat. No. 6,463,527.

(60) Provisional application No. 60/071,516, filed on Jan. 15, 1998, provisional application No. 60/041,044, filed on Mar. 21, 1997.

(51) Int. Cl.
*G06F 15/76* (2006.01)
(52) U.S. Cl. ...................................... 712/30
(58) Field of Classification Search .......... 712/228, 712/23, 219, 220, 9, 24, 217, 218, 227, 22, 712/213, 245, 30; 709/223, 102, 103, 104, 709/105, 106, 107, 108, 332, 405, 205, 216; 717/116, 161; 718/101, 102, 103, 104, 105, 718/106, 108, 109
See application file for complete search history.

(56) References Cited

U.S. PATENT DOCUMENTS

| 5,020,059 | A | * | 5/1991 | Gorin et al. ..................... 714/3 |
| 5,050,070 | A | * | 9/1991 | Chastain et al. ............. 712/203 |
| 5,151,991 | A |   | 9/1992 | Iwasawa et al. ............. 395/700 |
| 5,339,415 | A | * | 8/1994 | Strout, II et al. ............ 709/102 |
| 5,379,432 | A | * | 1/1995 | Orton et al. .................. 719/315 |
| 5,381,534 | A | * | 1/1995 | Shi ............................. 709/203 |
| 5,404,469 | A |   | 4/1995 | Chung et al. ................ 395/375 |

(Continued)

FOREIGN PATENT DOCUMENTS

WO    WO 98/43193    1/1998

OTHER PUBLICATIONS

E.H. D'Hollander, "Partitioning And Labeling Of Loops By Unimodular Transformations," IEEE Transactions on Parallel and Distributed Systems vol. 3(4) Jul. 1992 pp. 465-476.

(Continued)

*Primary Examiner*—Eddie P Chan
*Assistant Examiner*—John Lindlof
(74) *Attorney, Agent, or Firm*—Nancy R. Gamburd; Gamburd Law Group LLC

(57) ABSTRACT

The invention presents a unique computational paradigm that provides the tools to take advantage of the parallelism inherent in parallel algorithms to the full spectrum from algorithms through architecture to implementation. The invention provides a new processing architecture that extends the standard instruction set of the conventional uniprocessor architecture. The architecture used to implement this new computational paradigm includes a thread control unit (34), a spawn control unit (38), and an enabled instruction memory (50). The architecture initiates multiple threads and executes them in parallel. Control of the threads is provided such that the threads may be suspended or allowed to execute each at its own pace.

30 Claims, 5 Drawing Sheets

U.S. PATENT DOCUMENTS

| | | | | |
|---|---|---|---|---|
| 5,430,850 | A | * 7/1995 | Papadopoulos et al. | 719/314 |
| 5,519,867 | A | 5/1996 | Moeller et al. | 395/700 |
| 5,546,593 | A | 8/1996 | Kimura et al. | 395/800 |
| 5,557,747 | A | * 9/1996 | Rogers et al. | 709/223 |
| 5,588,152 | A | * 12/1996 | Dapp et al. | 712/16 |
| 5,590,326 | A | 12/1996 | Manabe | 395/477 |
| 5,666,524 | A | * 9/1997 | Kunkel et al. | 707/3 |
| 5,724,565 | A | * 3/1998 | Dubey et al. | 712/245 |
| 5,729,710 | A | 3/1998 | Magee et al. | 395/413 |
| 5,768,594 | A | * 6/1998 | Blelloch et al. | 717/149 |
| 5,771,382 | A | * 6/1998 | Wang et al. | 709/100 |
| 5,812,811 | A | 9/1998 | Dubey et al. | 395/392 |
| 5,838,976 | A | * 11/1998 | Summers | 717/130 |
| 6,079,008 | A | 6/2000 | Clery, III | |
| 6,463,527 | B1 | * 10/2002 | Vishkin | 712/245 |

OTHER PUBLICATIONS

R.H. Halstead and T. Fujita, "MASA: A Multithreaded Processor Architecture for Parallel Symbolic Computing," In Proceedings of the 15th Annual International Symposium an Computer Architecture, pp. 443 451, New York, Jun. 1988. IEEE.

C.W. Kessler and H. Seidl, "The Fork95 Parallel Programming Language: Design, Implementation, Application," International Journal on Parallel Programming vol. 25(1), pp. 17-50, Feb. 1997.

PCT International Search Report PCT/US98/05975 Apr. 14, 2003.

PCT Written Opinion PCT/US98/05975 Apr. 22, 1999.

G. Yu, K. Kaneko, G. Bai, and A. Makinouchi, "Transaction Management for a Distributed Object Storage System Wakashi—Design, Implementation and Performance," In Proceedings of the 12th International Conference on Data Engineering, Feb. 26-Mar. 1, 1996 New Orleans, Louisiana p. 460-468.

U. Vishkin. From algorithm parallelism to instruction-level parallelism: an encode-decode chain using prefix-sum. In Proc. 9th ACM Symposium on Parallel Algorithms and Architectures (SPAA), 1997.

U. Vishkin, S. Dascal, E. Berkovich and J. Nuzman. Explicit Multi-Threading (XMT) Bridging Models for Instruction Parallelism. In Proc. 10th ACM Symposium on Parallel Algorithms and Architectures (SPAA), 1998.

* cited by examiner

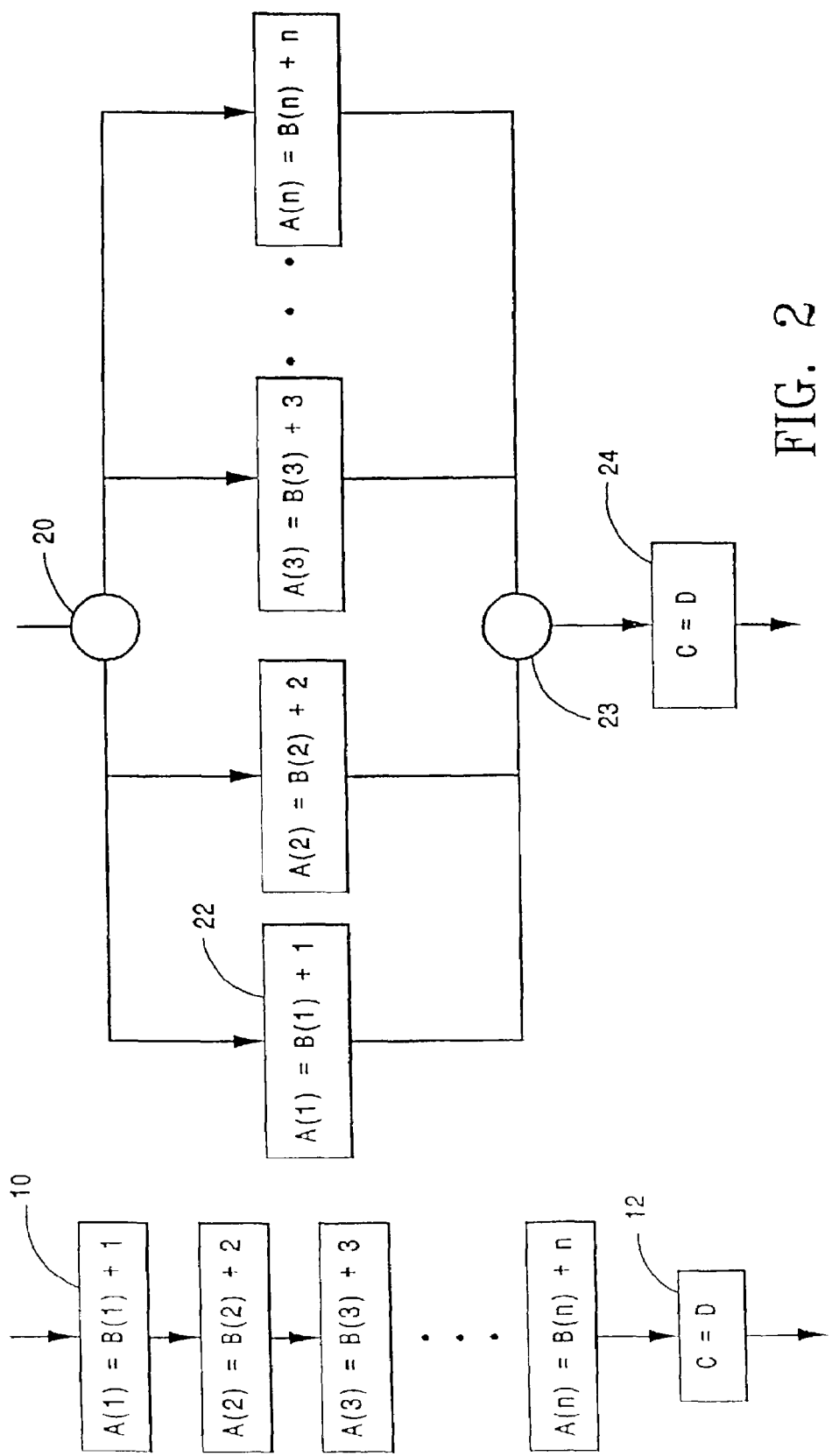

SPAWN-JOIN INSTRUCTION SET ARCHITECTURE FOR PROVIDING EXPLICIT MULTITHREADING

This application is a continuation of U.S. application Ser. No. 09/380,571, filed Sep. 7, 1999, now U.S. Pat. No. 6,463,527, which was derived from and claims the benefit of U.S. Provisional Patent Application No. 60/041,044, filed Mar. 21, 1997, and Provisional Application No. 60/071,516, filed Jan. 15, 1998, the disclosures of which are all incorporated herein by reference in their entireties.

BACKGROUND OF INVENTION

The way commodity computers have been designed is based on the so-called "von-Neumann architecture," which dates back to 1946. The computer program, in the form of instruction-code, is stored in the computer memory. Each instruction of the program is then executed sequentially by the computer. A single program-counter (PC) is used to track the next instruction to be used. This next instruction is either the successor of the present instruction in the stored program, or some other instruction as designated by a jump or branch command.

Consider the following standard code which is provided as an example to demonstrate this current practice.

For i=1 to n do
Begin
A(i)=B(i)+i
End
C=D

FIG. 1 shows the steps followed when the above standard code is executed by a processing element using a standard program counter. Each step 10 in the For i=1 to n loop is executed serially. When the loop is completed, the next command 12 is executed. Current instruction code ends each loop with a branch command, which in all but the last iteration will direct the execution to another iteration of the loop. The branch command is used for the sole purpose of sequencing instructions for execution and results in a serial order of execution, where only one instruction is scheduled for execution at a time. The generic one-processor "Random Access Machine (RAM)" model of computation assumes that instructions are executed sequentially, one after another, with no concurrent operations and where each primitive operation takes a unit of time. As the number of transistors on an integrated circuit or chip doubles every 1-2 years, the challenge of making effective use of the computational power of a chip needs to be addressed in new ways.

All major computer vendors have announced processors exhibiting ILP in the last few years. Examples include: Intel P6, AMD K5, Sun UltraSPARC, DEC Alpha 21164, MIPS R10000, PowerPC 640/620 and HP 8000. These processors tend to deviate from the typical PAM sequential abstraction in two main ways to employ ILP: (i) Pipelining—each instruction executes in stages, where different instructions may be at different stages at the same time; and (ii) Multiple-issue—several instructions can be issued at the same time unit. The parallelism resulting from such overlap in time in the execution of different instructions is what is called "instruction-level parallelism (ILP)."

In *Computer Architecture: A Qualitative Approach* (2nd Ed. 1996) by J. L. Hennessy and D. A. Patterson, the standard textbook in this field, the disclosure of which is incorporated herein by reference, it is stated that hardware capabilities will allow ILP of several hundreds by the beginning of the next decade. Unfortunately, the same textbook also states that the main bottleneck for making this capability useful is the rather limited ability to extract sufficient ILP from current code. This has been established in many empirical studies.

SUMMARY OF THE INVENTION

The invention presents a unique computational paradigm that provides the tools to take advantage of the parallelism inherent in parallel algorithms to the full spectrum from algorithms through architecture to implementation. With the invention, programmers at the highest-level of abstraction can dictate the interthread parallelism on the instruction level and thus increase the extraction of instruction level parallelism (ILP) from code and its execution on functional units.

This explicit use of ILP throughout the various levels of programming simplifies the hardware needed to extract ILP. Moreover, it brings the concepts of a high-level language down to an instruction code language. As a result, parallel computing becomes much more like serial computing where code in high-level languages (e.g., C) resembles instruction code.

The above and other advantages of the invention are derived by providing a new instruction set architecture that extends the standard instruction set of the conventional uniprocessor architecture. New instructions added to the existing instruction set but used for the new processing elements described herein may be used on an instruction code level, as well as through the algorithmic level to make explicit the interthread parallelism in a given program.

The architecture used to implement this new computational paradigm includes a thread control unit (TCU), a spawn control unit (SCU), and an enabled instruction (EI) memory. Multiple threads are initiated and executed in parallel. Control of the threads is provided such that the threads may be suspended or allowed to execute at their own pace irrespective of their order provided the semantics of the code allow. Such independence of Order semantics results in an architecture that is engineered to cope with irregular or unpredictable flows of program execution that may occur due to dynamically varying amounts of parallelism.

The invention provides new architectural tools for expressing TLP in an interthread manner without requiring simultaneous progression on all parallel threads and permitting suspension of the threads.

BRIEF DESCRIPTION OF THE DRAWINGS

The foregoing and other advantages of the invention will become more apparent from the detailed description of the preferred embodiments of the invention given below with reference to the accompanying drawings in which:

FIG. 1 is a flow chart illustrating the steps followed when standard instruction-code is executed using a known random access machine (RAM) model;

FIG. 2 is a flow chart illustrating the parallel execution of code in accordance with a preferred embodiment of the invention;

DETAILED DESCRIPTION OF THE PREFERRED EMBODIMENTS

Figure 3:
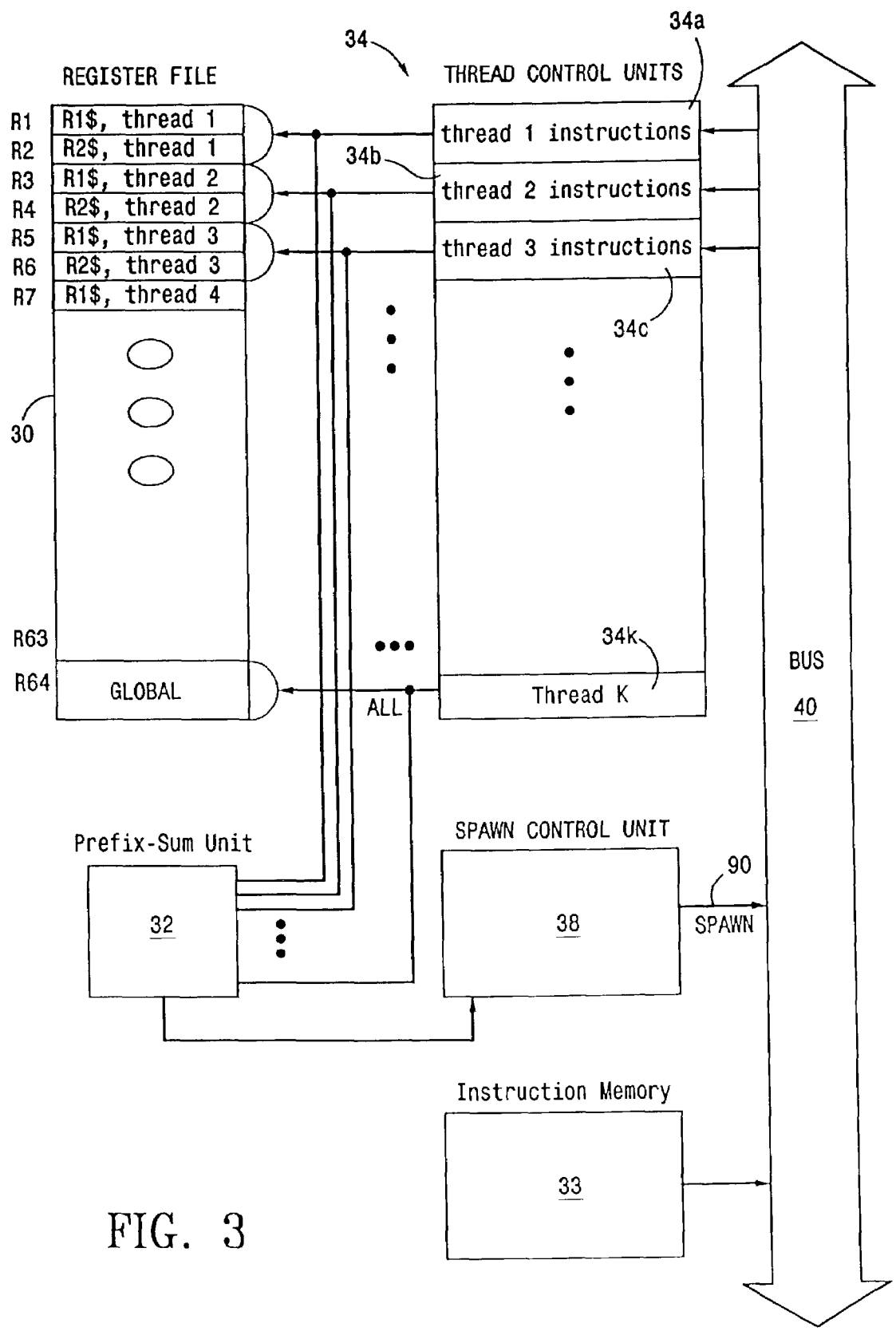
FIG. 3 shows a block diagram of a computer system in accordance with a preferred embodiment of the invention.

The invention will be described in detail as set forth in the preferred embodiments illustrated in FIGS. 2 through 5. Although these embodiments depict the invention in its preferred application to a computer system used to run a computer program implementing parallel algorithms, it should be readily apparent that the invention has equal application to programs implementing other algorithms or routines, or any other type or configuration of processing system that encounters the same or similar problems.

The invention increases the instruction level parallelism (ILP) that can be extracted from code by providing a new computer architecture that may be programmed to perform parallel algorithms using a compiler that extends the standard instruction set of a conventional uniprocessor to include instructions that explicitly initiate parallel processing steps. In a preferred embodiment, the instruction set would include a new "Spawn" instruction that initiates two or more processing steps (e.g., threads) concurrently.

A "Join" instruction is also provided in the extended instruction set. This "Join" instruction terminates the various threads then performing in parallel, making a transition into serial execution.

The following exemplary program code, together with the process flow chart shown in FIG. 2, illustrates the use of the Spawn and Join commands in accordance with the invention.

| 1.  | li    | R1,0                    |
| --- | ----- | ----------------------- |
| 2.  | lw    | R2,0(Rn)                |
| 3.  | SPAWN | R3,0,R2,2               |
| 4.1 | li    | R1$,1                   |
| 4.2 | lwa   | R2$,B_OFF(R0),4[R0$]    |
| 4.3 | add   | R2$,R2$,R0$             |
| 4.4 | swa   | R2$,A_OFF(R0),4[R0$]    |
| 5.  | JOIN  | R3,R2                   |
| 6.  | (implementation of C = D) | |

As shown in FIG. 2, and as will be described in more detail below, after execution of the Spawn command in step 20, a plurality of threads (1 . . . n) are "spawned," each containing a group or series of instructions numbered 4.1, 4.2, 4.3, and 4.4. Assuming that the hardware has the capacity to service all n threads concurrently, in step 22, all n threads are executed or run in parallel, thereby achieving an "interthread" parallelism state. The results of this concurrent execution are synchronized at the Join instruction in Step 23. Sequential execution of the main program can then be resumed at instruction number 6 (step 24). (It should be noted that, depending on the implementing hardware used to execute each thread, the instructions 4.1-4.4 within each thread may also be performed in parallel relative to each other to achieve an "intrathread" parallelism state.) Step 1 loads 0 into R1 and Step 2 loads Rn, which is assumed to hold n the number of threads, into R2.

The Spawn command can instruct the spawning of any number of threads concurrently to achieve the explicit multi-threading (XMT) environment of the invention. A "thread" is a series of instructions executed with a given set of parameters as guided by a program counter (PC). The group of instructions 4.1-4.4 may be considered a "thread." "Multithreading" refers to the use of a plurality of "threads," which may each be run with a different set of given parameters and program counters.

The Spawn command has the following syntax:
SPAWN (Rb,j, Rn, REGS)

Using this spawn command format the number of threads which are initiated or deferred by the processor may be regulated. The command can specify the number of registers local to each "thread" or allow the compiler to select the appropriate number and type of registers based on the particular needs of the instruction code.

In the example program above, Rn threads are indexed j, j+1, . . . j+Rn−1. The command assigns REGS physical registers to local virtual registers. Typically initialized to 0, global register Rb is a base register for the SUMI command of the matching Join instruction. This Spawn and Join syntax is not too different than the use of similar symbols in the high-level language "FORK," described for example in the article by C. W. Kessler and H. Seidl, "The Fork95 Parallel Programming Language: Design, Implementation, Application," International Journal on Parallel Programming, 25(1), pp. 17-50 (1997), which is incorporated herein by reference in its entirety. The assembly code also follows the style of MIPS assembly code disclosed by Patterson and Hennessy in "Computer Organization & Design. The Hardware/Software Interface," 1994, which is incorporated by reference in its entirety.

An elaborate presentation of the assembly code is disclosed in "Multi-Threading Bridging Models for Explicit Instruction Parallelism," by Vishkin, Dascal, Berkovich and Nuzman, UMIACS-TR-98-05, University of Maryland Institute for Advanced Computer Studies, College Park, Md. 20742-3251, January 1998, which is incorporated herein by reference in its entirety.

Any instruction initiated by a Spawn instruction is the first in its thread. As long as there is a sequence of single successive instructions, all of the instructions between the spawn instruction and a join instruction are considered as being in the same thread.

In accordance with a preferred embodiment, the invention is preferably formulated in what is referred to as a "Spawn Multi-Threading (Spawn MT)" model. As illustrated in FIG. 3, a number, e.g., k, of thread control units (TCUs) 34 are provided to execute the threads spawned by the Spawn command. A spawn control unit (SCU) 38 is provided to generate an enable signal in the form of spawn instruction 90, which is sent over a bus 40 to TCUs 34. Spawn instruction 90 initiates a plurality of threads to run concurrently on TCUs 34.

A register file 30 containing a plurality of local and global registers (R1, R2, R3 . . . R64) is provided for use by TCUs 34. A prefix-sum unit 32, coupled to TCUs 34, is also provided for providing a hardware implemented prefix-sum calculation handling competing TCUs (as will be described in more detail below). In the preferred embodiment, the prefix-sum unit 32 is implemented in accordance with the disclosures in U.S. patent application Ser. No. 08/667,554 of June 1996 and continuation-in-part application Ser. No. 08/757,604, filed Nov. 29, 1996, the disclosures of which are both incorporated herein by reference. (It should be readily apparent, however, that any hardware or software implementation of the prefix-sum calculations described herein may be employed. Preferably, the implemented calculation can be performed with minimal delay. In this preferred embodiment, for example, the prefix-sum calculation is assumed to be performed in a single instruction cycle, as implemented in the above-identified patent applications.)

Use of the prefix-sum instruction PS R1, R1$, as shown in a later example, has the following effects. R1$ participates in a parallel prefix sum computation with respect to base R1. Suppose that R1=A and R1$=B. The definition of an individual prefix sum is that R1=A+B, and R1$=A. The prefix-sum instruction is defined through grouping of individual prefix-sum instructions. PS Ri Rj, an individual prefix-sum with respect to registers Ri and Rj, means the value of register Ri is added to the value of register Rj and the result is stored in Ri, and the original value of Ri is stored in Rj. In and of itself, this instruction has an effect similar to a simple "add" instruction. However, the difference between the PS instruction and an "add" instruction is that several PS instructions may be cascaded into a multiple-PS instruction.

For example, the sequence of k instructions:
PS R1, R2
PS R1, R3
. . .
PS R1, R(k+1)
performs the prefix-sum of the base $R1$ and the elements R2, R3, . . . , R(k+1). Suppose that R1=A1, R2=A2, . . . Rk=Ak and R(k+1)=A(k+1). These sequence of k instructions, and therefore the multiple-PS, results in
the following:
R2=A1
R3=A1+A2
R4=A1+A2+A3
. . .
R(k+1)=A1+A2+A3+ . . . +Ak
R1=A1+A2+A3+ . . . +Ak+A(k+1)

In other words, the sequence of prefix-sum instructions becomes a multi-operand instruction. A multiple-PS instruction occurs in code can come all from a single thread, as above. However, they can also come from different threads. Suppose that each of the individual prefix-sum instructions (forming a multiple-PS instruction) comes from a different thread and the code semantics allows independence of order among the threads. This semantics implies that any order of concurrent single prefix sums instructions having the same base is acceptable.

For example, suppose that the instructions
PS R1, R2
PS R1, R3
PS R1, R7 are provided by threads 1,2 and 6, respectively, in a certain clock and no other concurrent instructions with respect to base R1 are provided. Then, having the resulting multiple-PS instruction produce any of the six permutations of
PS R1, R2
PS R1, R3, and
PS R1, R7 is acceptable for that clock.

Instruction memory 33 is provided for storing the instructions making up the "main" program (e.g., instructions numbered 1-6 of the example program above). When in the serial state, the main program is executed with a system processor. Any of the processing elements used in the system such as TCUs 34, SCU 38, or even a dedicated processing element (not shown) may be used to run the main program in this state.

During execution of the main program, a Spawn command (e.g., instruction number 3 in the program above) will be encountered in the serial state by the default processing element (e.g., TCU 34a). In response, a transition from the serial to the parallel state occurs. The Spawn command activates n virtual threads indexed by integers (called "thread identification numbers (IDs)") between 1 and n.

As a result, SCU 38 will generate a Spawn instruction 90 over local bus 40 to TCUs 34. This Spawn instruction 90 preferably initiates all of the physical threads that the system hardware permits. In this case, a number k physical threads will be executed by a number k TCUs 34. (A distinction is made herein between the terms "virtual" and "physical" threads because in many cases the number of threads spawned will exceed the number of TCUs (or other processing elements) in a given system that are actually capable of executing each thread. The term "virtual" thread refers to all of the possible threads spawned as a result of the initial Spawn command in the main program. The term "physical" refers to the threads that are actually implemented in hardware at a given moment.)

Once initiated, each TCU 34 will execute its own thread using a unique thread ID assigned to the thread being executed. Because all of the TCUs 34 will receive a set of instructions derived from a single common program, the system is referred to as a "single program multiple data (SPMD)" system. Preferably, a copy of the thread instructions (referred to as "Spawn-Join instructions") is transferred on the bus from instruction memory 33 to local memory in each TCU 34. Although the instructions retrieved into TCU local memory may be the same for each of the TCUs 34, the interpretations made by each individual TCU 34a, 34b, 34c, . . . 34k will be different based on the individual thread ID and data parameters in associated registers R1 . . . R64 of register file 30 used at the time. In the preferred embodiment, TCUs 34a, 34b, 34c, . . . 34k will be initially assigned to execute threads having thread ID numbers 1, 2, 3, . . . k, respectively. Threads corresponding to thread ID numbers k+1, k+2, . . . n will be subsequently executed by individual TCUs 34 in turn as they terminate current execution of their respective threads.

In accordance with the invention, TCUs 34a, 34b, 34c, . . . 34k preferably by performing code which operates in an independence of order semantics principle. That is, each TCU can operate at its own speed independently of all other TCUs 34. Each of the TCUs executes the Spawn-Join instructions concurrently (relative to other TCUs) until reaching a Join instruction, which serves to terminate the parallel threads and achieve synchronization since transition into serial state occurs only after all threads terminated.

The Join instruction has the following syntax:
JOIN (Rb, Rn)

Using this format, the Join instruction contains a summation instruction that accumulates the number of threads reaching the Join command. In particular, each thread increments global register Rb. Once the value of Rb reaches n, the Spawn-Join loop is finished and the main program transitions from the parallel state to the serial state. The Join command preferably utilizes a parallel prefix sum computation (or using, for example, a "SUMI" instruction) with respect to variable Rb possibly using prefix-sum unit 32. The SUMI (for summing integers) command has a syntax: SUMI (Rb, Imm). A sequence of such commands with the same Rb causes summation of the immediate values Imm to be produced in parallel. At compile time, the relation $0 \leq Imm \leq 3$ is inserted and the sequence takes unit time for $\leq k$ instructions.

When the number of physical threads k that may be implemented in hardware is less than the number of virtual threads n spawned by the Spawn command in the main program, SCU 38 must track the thread IDs of the virtual threads not yet issued. (For this purpose, SCU 38 may include a local memory or may rely on an external memory or other storage device (not shown).) When one of the TCUs 34 executes a Join instruction and thus terminates its execution of its respective thread, it will be available for running the next one of the threads not yet issued. To indicate its availability, the terminating TCU 34 (as well as any other terminating TCU) outputs a signal (e.g., a "1" bit) to prefix-sum unit 32. The prefix sums are then calculated using all of the inputs from TCUs 34 into prefix-sum unit 32. Prefix-sum unit 32 then reports to SCU 38 that a TCU has terminated and is available for processing another thread.

In response, SPU 38 issues a Spawn-Recur instruction over bus 40 to TCUs 34. The syntax of the Spawn-Recur instruction is:

SPAWN-RECUR (k+1,n−k)

The first part "k+1" of the Spawn-Recur instruction format refers to the current virtual thread ID that has yet to issue. The second part "n−k" of the instruction refers to the number of threads that remain to be spawned.

The prefix-sum unit 32 will also provide prefix sum results to the terminating TCU(s) 34. Based in part on these outputs, each terminating TCU 34 can ascertain a new unique thread ID. The prefix-sum results automatically arbitrate between competing TCUs 34 that terminate threads at the same time. In particular, the results dictate the order in which the competing TCUs 34 will be associated with serial ID numbers of the virtual threads not yet issued. Hence, where TCU 34a and TCU 34c, for example, are competing for the next available thread from an original 1000 threads spawned, and the prefix sum unit awards priority to TCU 34a, upon receiving a Spawn-Recur instruction having the format "SPAWN-RECUR (101,900)", TCU 34a will be associated with thread ID number "101" out of 900 remaining threads while TCU 34c will be associated with thread ID number "102".

Each terminating TCU 34 receiving the Spawn-Recur instruction will re-execute its Spawn-Join instructions stored in its local memory, interpreting the instructions, however, differently based on the new thread ID and data parameters used. The SCU 38 will continue to issue Spawn-Recur instructions in like manner until all of the n virtual threads have been issued to TCUs 34.

Each individual TCU 34a, 34b, 34c, ... 34k preferably executes the Spawn-Join instructions in its thread serially tracking each instruction with a local program counter (PC), as is well known in the art. In an alternative embodiment, however, parallel architectures such as those based on superscalar (e.g., branch prediction, out-of-order execution, etc.), Very Long Instruction Word (VLIW), vectoring or any other parallel processing-type architecture known, may be employed to execute the Spawn-Join instructions in parallel to provide a state of "intrathread" parallelism. The TCUs 34 may perform a variety of functions such as global read, global write, as well as local read and writes to registers in register file 30. This is done using functional units in a manner well known in the art. Although conflicts with concurrent reads of global registers (e.g., R64) can be avoided (e.g., when implementing a prefix-sum function), concurrent global writes must be synchronized using a prefix-sum functional unit in order to avoid serializing. When a concurrent write into a global register occurs, a prefix-sum unit calculates the prefix sums based on outputs from the relevant TCUs 34. The resulting prefix sums will award one of the TCUs 34 with the "right" to access the global register and guide the remaining TCUs 34 to proceed with their next instruction(s). In the alternative, a "Mark" instruction, which is a simpler or degenerate form of prefix-sum calculation will also be useful to designate the awarded TCU 34.

The foregoing operation of the Spawn MT architecture model, particularly the independent pace in which each thread can progress irrespective of the progress of other threads due to its independence of order semantics of code, is referred to as its "asynchronous" mode of operation. The Spawn MT model may alternatively be operated in a "synchronous" mode of operation. In this mode, the "Spawn" operation is performed in "lock-step" where, for example, the first step of each thread must be completed before proceeding with the second step. Thus, the execution of each thread becomes interdependent on the progress of all the other threads. Preferably, the "Spawn" command will be denoted "Spawnsync" instead of "Spawn" in this synchronous mode.

Figure 4:
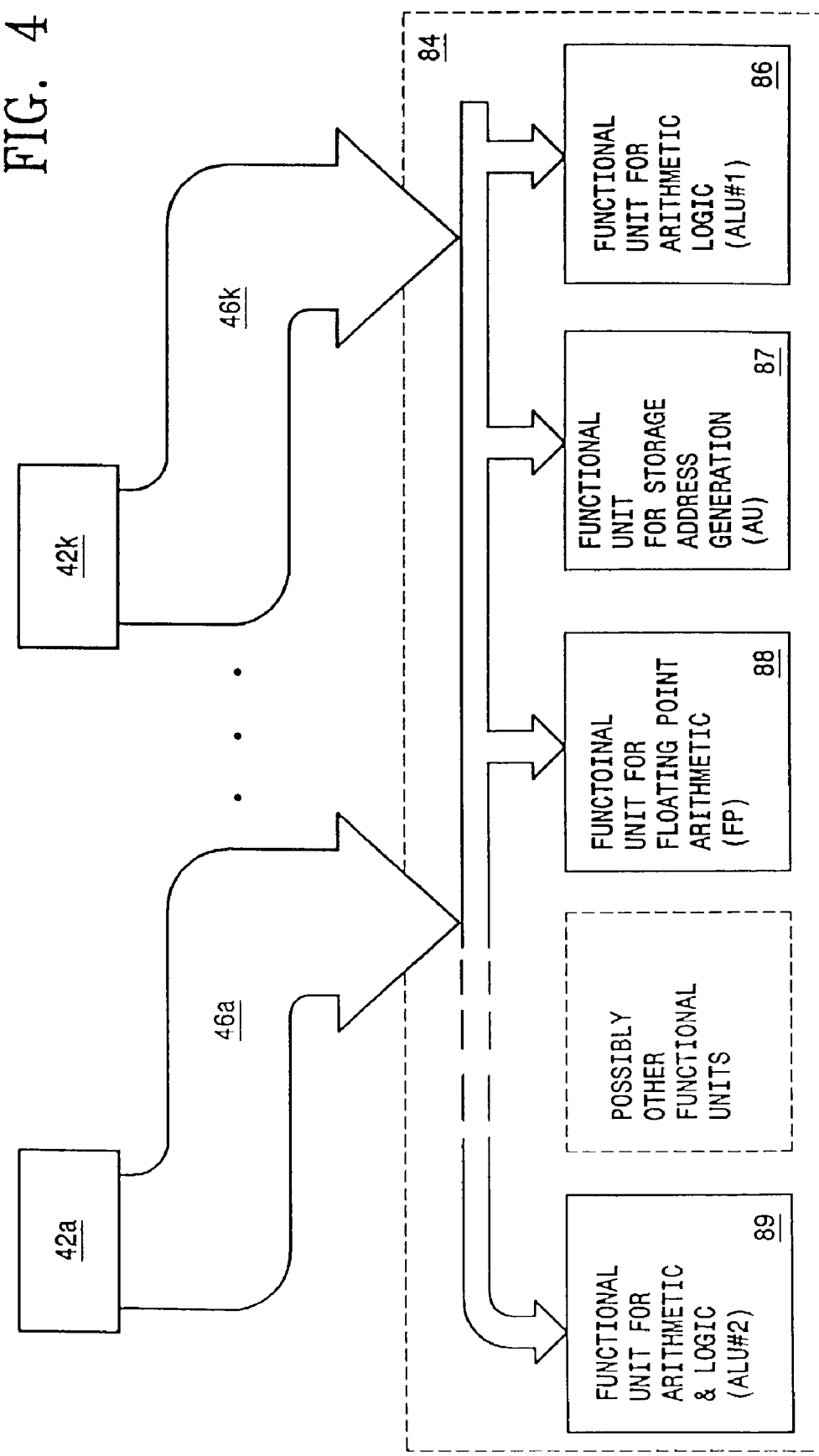
FIG. 4 shows a block diagram of a group of standard functional units according to a preferred embodiment of the invention.
Figure 5:
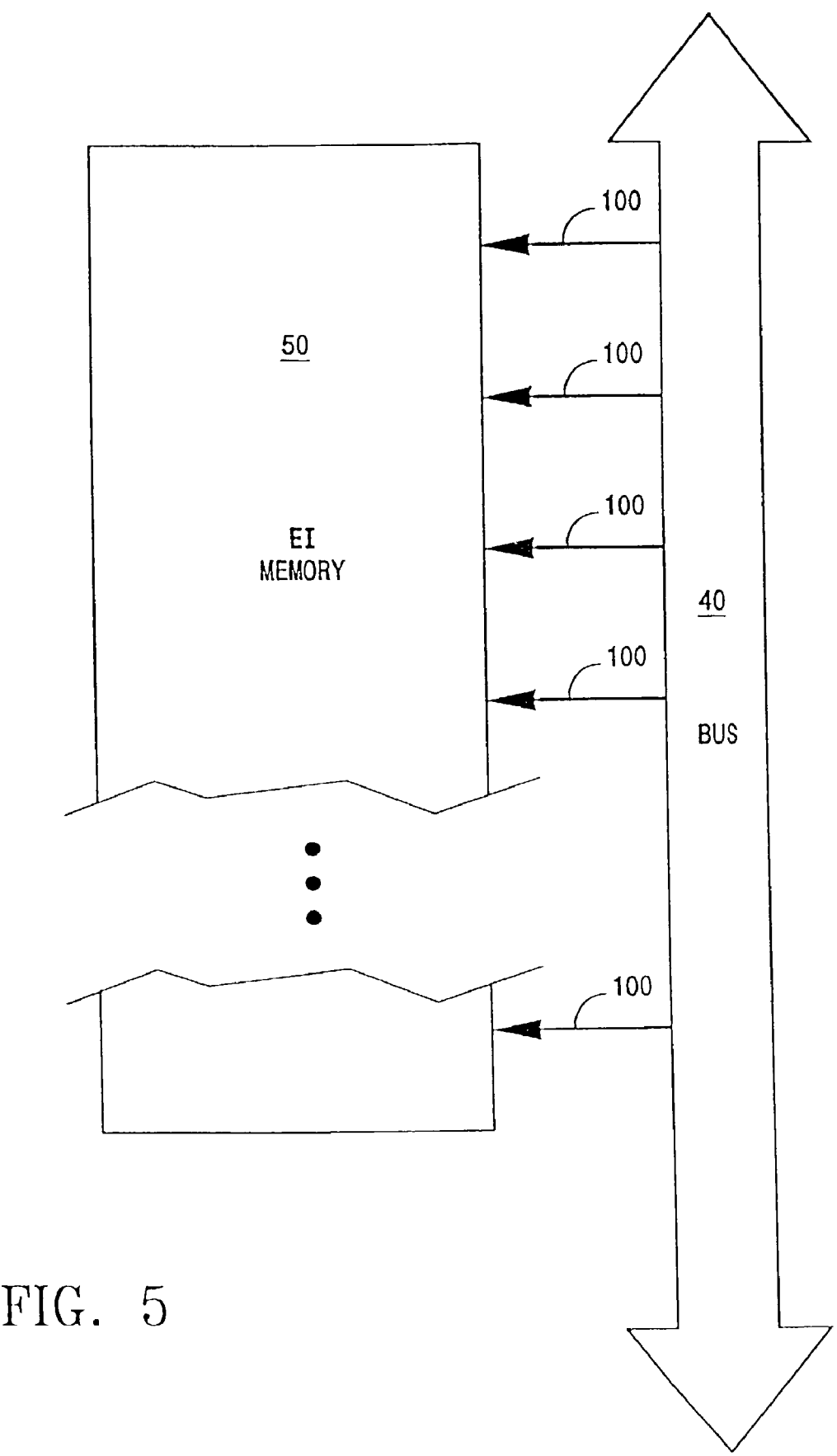
FIG. 5 shows a block diagram of a Enabled Instruction (EI) Memory in accordance with a preferred embodiment of the invention.

In the preferred embodiment, the processing elements making up TCUs 34a through 34k incorporate local instruction memory units 42a through 42k, respectively, as shown in FIG. 4. In a preferred construction of the computer architecture, instruction memory units 42a-42k store and/or track instructions that are to be performed by one of a plurality of groups 84 of standard functional units. Each group 84 preferably has a plurality of functional units 86, 87, 88, 89, etc. Additional functional units. Each functional unit is capable of executing instructions from one or more of the threads sent from tracking 42a-42k over bus 46a-46k, respectively, or any other conductive path known to those of ordinary skill in the art.

The precise implementation of the functional units by the issued instructions in instruction memory units 42a through 42k is left to the system designer depending on the hardware utilized. A high degree of ILP, of course, will be achieved where at least one group of functional units is dedicated to one TCU 34 to process at least one instruction in the TCU local memory. Where less than one group of functional units is dedicated to each TCU 34, the designer is provided with the flexibility of choosing which functional units for best servicing the active TCUs 34 and their respective threads.

Figure 6:
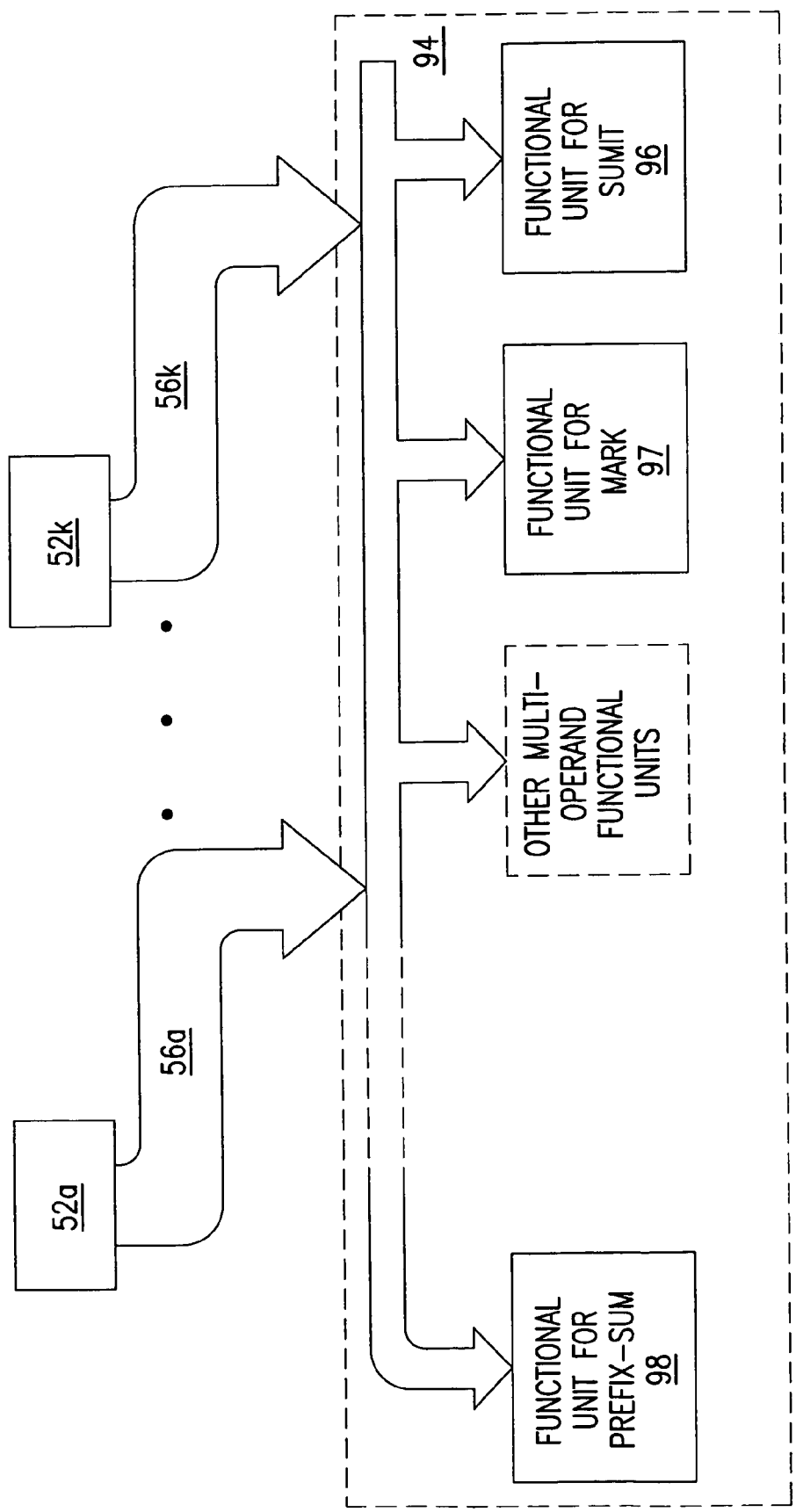
FIG. 6 shows a block diagram of a group multi-operand functional units according to a preferred embodiment of the invention.

In an additional preferred construction local instruction memory units 52a through 52k store and/or track other instruction that are to be performed by on of a plurality of groups 94 of multi-operand functional units as shown in FIG. 6. Each group 94 preferably has a plurality of multi-operand functional units 96,97,98 etc. Each of the functional units is capable of executing multi-operand operations; the operands for each operations can come from different threads each having the an individual instruction (such as individual prefix-sum). All instruction referring concurrently to the same functional units must have the same base register. This provides inter-thread parallelism. A functional unit e.g., prefix-sum) can also get all its operands from a single thread, providing intra-thread parallelism." Instructions from the threads are sent from tracking 52a-k over bus 56a-56k, or any other interconnect known to those of ordinary skill in the art.

In the preferred embodiment, the hardware will be able to issue at least p instructions per cycle. Any combination of p instructions is possible and each TCU 34 can contribute between the number 0 and p instructions to those p instructions/cycle. The desired "interthread" parallelism is achieved to the extent that several TCUs contribute instructions issued at the same cycle. The desired "intrathread" parallelism is achieved to the extent that any given TCU contributes several issued instructions to a cycle.

In one embodiment, TCUs 34 are divided into groups. The TCUs 34 of any given group share functional units, as shown, for example, in D. M. Tullsen, S. J. Eggers, and H. M. Levy, "Simultaneous Multithreading: Maximizing On-Chip Parallelism," In Proc. 22nd ISCA (1995).

In the preferred embodiment, the Spawn instruction is available in the assembly language, but the Spawn-Recur commands are only available to the compiler or processing elements. The JOIN Rb Rn instruction preferably contains a summation instruction such as SUMI, or a parallel prefix-sum instruction.

Alternatively, global variables can be used to store local variables with proper management by the compiler or even the programmer. Good static (i.e., by compiler), or dynamic, scheduling should avoid initiating too many threads. This will alleviate a later need to put threads on hold. Good scheduling should also aim not to be starved for parallelism due to lack of advancement along critical (or possibly non-critical) paths.

For example, if each thread generated by some spawn instruction has two parts: the length of the first is not fixed and the length of second is, it could be advantageous to prefer working on the first part of all threads, as a first priority, and on the second part as a second priority, thereby reducing the likelihood that the need to complete execution of a small number of threads (or a single thread) will force a low level of parallelism.

In another preferred embodiment, the invention operates in what is referred to as an "Elastic Multi-Threading (EMT)" model. In this model, operation of the invention is very similar to the operation of the Spawn MT model described above. The EMT model, however, provides the additional flexibility of nesting spawn instructions. When the Spawn-Join instructions making up a particular thread are duplicated from instruction memory 33 over bus 40 to a TCU 34, the thread instructions will be placed in both a local instruction memory 42, and also, at times, in a storage device referred to as an "enabled-instructions (EI)" memory 50 (FIG. 5), as will be described below. Preferably, the EI memory 50 is an extension to the local instruction memories included in the system memory hierarchy, which is composed of the CPU, caches, main memory and possibly even some forms of secondary memory, for managing the execution of threads. (In an alternative embodiment, the EI memory 50 is also local to TCUs 34a-34k.) In the same manner as in the Spawn MT model, each instruction for execution will be stored in a local instruction memory unit 42 and executed by functional units 86-89 (FIG. 4), and functional units 96-98. A register file 30 may also be used in the same manner described above.

The primary difference between the Spawn MT and EMT models, however, occurs when a given TCU 34 encounters a "spawn" instruction from the thread instructions stored in its local memory 42. A "spawn" instruction in local memory unit 42 represents a nested thread within the current thread being executed by TCU 34. In order to properly execute the instructions in such nested thread (referred to as a "child thread"), the Spawn-Join instructions of the current thread being executed in TCU 34 (referred to as the "parent thread") must be suspended. Thus, in accordance with a preferred embodiment of the invention, the parent thread and possibly other threads that have been suspended are stored in EI memory 50. (Preferably, the parent thread is stored without the nested instructions.)

The Spawn-Join instructions making up the children threads will then be spawned into the TCUs in place of the parent thread and other suspended threads. Because the parent thread will be relocated to EI memory 50, which represents a lower section in the memory hierarchy (e.g., main memory), the parent thread will not interfere with operation of the-"child" thread.

The EI memory is typically a third kind of memory used in the system in addition to the standard instruction memory and data memory. Like those types of memories, the EI memory can extend to all levels of the memory hierarchy. Similar to conventional data and instruction memories, EI memory 50 may occupy part of any level of the memory hierarchy: registers, any level of cache memory, main memory, or any other section of memory. It may include some bounded number of threads. For each of these threads, a program counter and bounded number of instructions which have been "enabled" for execution appear. Any number of them can be executed subject to machine resources.

In an alternative embodiment, instead of storing the original Spawn-Join instructions of the parent thread in a different (or lower) section of EI memory 50, the child thread may be stored in a different section of memory and the TCU program counter (PC) modified to reflect the first instruction in the child thread as the current instruction for execution. The PC can subsequently be reset upon execution of the join command in the child thread to reflect the next instruction in the parent thread as the current instruction for execution.

In case not all threads have been issued due, for example, to a limited number of available system resources, a Spawn-recur command may be issued by the SCU 38. This instruction will enable the processing element to issue the remaining threads at a later time in the same manner as previously described above. The invention thus provides for control of the number of threads enabled at any given time.

If during execution of the above sample program, the instruction SPAWN R3,0,R2,2 is stored in the local instruction memory unit 42, then its selection for execution by TCU 34 through SCU 38 will initiate threads 1, 2 ... k for some integer k. The Spawn instruction will also cause the parent thread to be moved to EI memory 50 (element 100 in FIG. 5). The child thread then takes the place of the parent thread in local instruction memory units of the TCUs 34 and is tracked for execution by their PCs.

Execution of the command SPAWN-RECUR is similar to the original Spawn instruction. For some integer x, threads k+1, k+2, ..., k+x will be initiated. If k+x<n, the instruction SPAWN-RECUR(k+n+1,n−k−x) will be brought into the SCU. For each thread its respective "li R1$,1" instruction will be executed.

An alternative implementation of the Spawn instruction enables much faster spawning of threads, but requires more memory. It will have the following general (recursive) effect: the Spawn instruction will spawn two or more SPAWN-RECUR instructions. If the SPAWN-RECUR instruction can spawn all of its threads, it will do so. Otherwise, it will continue to spawn several SPAWN-RECUR instructions until the number of threads reaches n.

For this and for concurrent execution of several SPAWN instruction occurring concurrently in different threads, a preferred embodiments may include several SCUs.

During the nesting of Spawn commands in the EMT model, the TCU assigns and stores a unique identification (ID) number to each active thread. This ID information is maintained in a table, together with spawning information regarding the relative position of each thread to predecessor ("parent") and successor ("child") threads. When a thread executes a Join instruction, the thread is terminated and control reverts back to the "parent" thread. Once all active threads have been terminated, a transition to the serial state is made, as in the operation described above.

An ability to "put on hold" threads and their enabled instructions by way of moving the registers of the threads and local variables to lower levels of the memory hierarchy can be provided. This ability is needed if higher levels of the memory hierarchy cannot hold all the memory they need. To the extent that local variables are used, the system will handle them similarly to local registers notwithstanding that each data type (e.g., integers, floating-points, structures, etc.) are treated separately.

Several additional aspects of the invention applicable to both Spawn MT and EMT models are mentioned below.

When a thread terminates or is otherwise finished with one or more registers, some "garbage collection"-type mechanism can be provided for freeing the registers for reassignment for and use by other threads.

To determine for each thread a given level of intrathread ILP, it must be determined how many registers the thread will need. The compiler will figure this out and either decide at compile-time, or defer until run-time, the decision as to how many registers to allocate to a thread. The number of registers will be passed by the compiler to the processing element or other hardware device.

The compiler will provide to the processing element, possibly through a designated register, or memory location, how wide the spawning it recommends.

Possibly hierarchical clustered organizations of hardware (e.g., registers) may make it advantageous to have groups of functional units allocated to clusters or threads rather than share functional access units, such as an adder or multiplier, by all threads.

In addition to PS instructions which will refer to registers only, such an instruction could take the form PS M[R1$] R2$, where the base address for the prefix-sum is a memory location. During execution of this instruction the processing element would perform the following:

(i) cache the base address;

(ii) create a copy in a register, which is hidden from the assembly language programmer; and (iii) lock the cached address (using, for example, a locking bit).

This will enable both a faster access by a future register-only PS command coupled with a write-back policy to the cached copy. This PS command could implement access of a PRAM algorithm to a shared memory location. The textbook *Introduction to Parallel Algorithms*, by J. JaJa, the disclosure of which is incorporated herein by reference, defines the PRAM model of parallel computation in an introduction to the PRAM theory of parallel algorithms.

Although the spawned threads are run in parallel independently, not all instructions can be executed without regard to other independently running instructions. For example, while concurrent read operations from a shared memory are possible, concurrent write access to the shared memory may give rise to conflicts between threads. To ensure conflict-free access, in accordance with a possible embodiment of the invention, the threads may be subject to an arbitration procedure to resolve the conflict, as is well known in the art. As an alternative, a "prefix-sum" instruction may be used to resolve the conflict, as found in the co-pending U.S. patent applications mentioned above, which are incorporated herein by reference in their entireties.

In using the arbitration procedure, exactly one of the threads that attempts to write into a shared variable obtains exclusive access through a "lock substitute" or "gatekeeper" for their shared variable in the same manner as discussed above. The selected thread writes into the shared variable, and each of the failed thread proceeds directly to its next instruction. This implementation of a concurrent write operation removes the requirement of "busy wait" states that would otherwise occur if the threads were forced to delay executing their instructions until the shared variable is available for write access.

The invention can further be described with reference to the following example.

EXAMPLE

Suppose a problem with:

a first array A=A(0), . . . , A(n−1), whose elements are integers and where n is an integer;

a second array B=B(0), . . . , B(n−1), whose elements are integers and where n is an integer; and a third array C=C(0), . . . , C(n−1), whose elements are 0 or 1 and where n is an integer.

For each i, $0 \leq i \leq n-1$, for which C(B(i))=1, copy A(i) into a different entry of a fourth array D=D(0), . . . , D(s−1), where s is the number of ones in C(B(i))=1, over $0 \leq i \leq n-1$.

The problem may be modeled on the algorithmic level by the following high-level program:

```
...
int x;
x=0
SPAWN(0,n);
{ int e;
  e=1;
  if (C[B[$]]==1)
      (PS(x,e);
       D[e] = A[$]}
}
n=x
...
```

In the above program, x is initialized to 0. Then, the SPAWN command spawns threads 0 through (n−1). Although not explicitly stated, a JOIN command is implied by the bracket "}", which ends the scope of the SPAWN command. The JOIN command is implemented using a parallel sum computation which increments an invisible global variable y. This invisible variable y is initialized to 0 by the SPAWN command. Thread $ initializes its local variable e to 1. When the condition for copying A($) into the compacted array D is met, the thread performs a prefix-sum with respect to the base x to find the location in D, and then copies A($) into that location of D. The thread terminates at the invisible JOIN after incrementing y. Once y reaches n, a transition into a serial state occurs and n gets the size of the array.

The instruction code for this operation would look as follows:

```
        ...
        li      R1,0
        lw      R2,0(Rn)
        SPAWN   R3,0,R2,4
        li      R1$,1
        lwa     R2$,B_OFF(R0),4[R0$]
        lw      R3$,C_OFF(R2$)
        bne     R3$,R1$,L
        PS      R1,R1$
        lwa     R4$,A_OFF(R0),4[R0$]
        swa     R4$,D_OFF(R0),4[R1$]
    L:  JOIN    R3,R2
        sw      R1,0(Rn)
        ...
```

The load-immediate command (li) initializes R1 to 0. The load-word command (lw) loads n into R2. The SPAWN command spawns R2 threads, indexed 0 to R2−1, and using 4 local registers per thread. The JOIN instruction matching the SPAWN instruction will count terminating threads into R3. R0$ always includes the thread index $, and will be a read-only local register. B_OFF is the base address for array B. The new load-word-array instruction is used to directly accessing array addresses. If R3$ equals 1, a prefix-sum is performed incrementing the counter R1. R1$ will provide the address into which to copy A($). A($) is then copied into compacted array D using the lwa and store-word-array (swa) instructions. Each thread reaching the JOIN command causes R3 to be incremented-by 1 using a new parallel-sum integer instruction, which is part of the JOIN instruction. Once R3 becomes equal to R2, all of the threads have terminated and the program switches back to the serial state. The size of the compacted array is then stored into address Rn.

Although preferred embodiments are specifically illustrated and described herein, it will be appreciated that modifications and variations of the invention are covered by the above teachings and within the purview of the appended claims without departing from the spirit and intended scope of the invention. For example, the apparatus and methods described herein can be implemented as a software program or as computer hardware, or as a combination thereof. The operands or fields accompanying the "Spawn," "Join" and "Prefix-Sum (PS)" instructions may be added to or removed from the preferred format described above. Moreover, additional or replacement instructions may be employed without detracting from the invention.

In addition, the foregoing architecture can easily be augmented with known memory enhancements such as caching and prefetching to increase the speed of access and execution. Another modification that can be made involves the use of the parallel "synchronous" mode in the Spawn MT model. This mode may be alternatively implemented in the serial state, allowing the hardware to extract the parallelism. The EI memory 50 described above with respect to the EMT model may alternatively be implemented as a centralized memory servicing some or all of the TCUs 34.

It should be further noted that two elements in our presentation whose global communication demand is relatively high are "PREFIX-SUM" and the BUS used for spawning threads. Fortunately, it turns out that hierarchical distributed implementations are possible for each of those elements. Such implementations will greatly improve their scalability. By way of example, suppose that we need to find the prefix sum of 640 single-bit numbers, and we can use at most 64-bit multi-operand functional units. We could partition the 640 bits into 10 groups and find the prefix sum for each group, since the sum of each group does not exceed 64 (which takes 6 bits), another 60-bit unit can perform prefix sums relative to the groups with the final prefix sums derived in one more step. The bus can be replaced by, for example, a two-tier hierarchy. For example, a bus that broadcasts from the SCU to 30 intermediate "stops," and then separately for each such stop have a bus that broadcasts further to 30 TCUs for a total of 900 TCUs.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but are only limited by the scope of the claims appended hereto.

What is claimed is:

1. A computer-implemented method of programming a computer system to execute an algorithm, wherein a plurality of program instructions correspond to the algorithm and wherein the plurality of program instructions comprises a parallel code block having n virtual threads, the computer-implemented method comprising:

compiling the plurality of program instructions into a plurality of computer instructions adapted to control the computer system to:
concurrently initiate execution of k physical threads by generating a thread enable signal in a form of a spawn command and assigning a virtual thread identification number to each physical thread;
retrieve a series of spawn-join instructions in response to the spawn command, each spawn-join instruction corresponding to a virtual thread and including a join command to signal termination of the corresponding virtual thread;
execute respective series of virtual threads in parallel and order-independently using the physical threads; and
calculate a prefix sum based on a terminating thread of the k physical threads and assign a new virtual thread identification number based on the prefix sum calculation;
wherein when the number of k physical threads is less than the number of n virtual threads, issue a thread enable signal in a form of a spawn-recur command when at least one join command has been executed, and wherein in response to the spawn-recur command, commence recurrent execution of the series of virtual threads with the new virtual thread identification number prior to termination of all virtual threads of the spawn command.

2. The computer-implemented method of claim 1, wherein the compiling step further comprises generating corresponding computer instructions adapted to control the computer system to store, in response to an enable signal, respective series of spawn-join instructions in corresponding sections of enabled instruction memory.

3. The computer-implemented method of claim 1, wherein the compiling step further comprises generating corresponding computer instructions adapted to control the computer system to execute a nested spawn instruction during execution of a series of spawn-join instructions, and to move a stored series of spawn-join instructions containing the nested spawn instruction and storing in its place in an enabled instruction memory a nested series of spawn-join instructions.

4. The computer-implemented method of claim 1, wherein the compiling step further comprises generating corresponding computer instructions adapted to control the computer system to broadcast the series of spawn-join instructions to a plurality of processing elements for processing k physical threads.

5. The computer-implemented method of claim 1, wherein the plurality of program instructions further comprises an explicit multithreaded assembly code.

6. The computer-implemented method of claim 5, wherein the explicit multithreaded assembly code further comprises a SPAWN command and a JOIN command.

7. The computer-implemented method of claim 6, wherein the SPAWN command is adapted, when executed, to initiate threads from a common single-program multiple-data program.

8. The computer-implemented method of claim 1, wherein the plurality of program instructions are compiled into assembly language instructions from a plurality of comparatively higher-level programming instructions.

9. The computer-implemented method of claim 1, wherein the plurality of program instructions are input in a machine-readable form.

10. The computer-implemented method of claim 1, wherein the algorithm is a parallel random access machine/model (PRAM) algorithm.

11. The computer-implemented method of claim 1, wherein the compiling step further comprises generating corresponding computer instructions adapted to control the computer system to provide a plurality of memory accesses substantially in parallel.

12. The computer-implemented method of claim 1, wherein the compiling step further comprises generating corresponding computer instructions adapted to control the computer system to provide a plurality of arbitrary concurrent write operations.

13. A computing system for execution of a plurality of program instructions comprising a parallel code block having n virtual threads, the computing system comprising:
   a hardware instruction memory adapted to store a series of spawn-join instructions of the plurality of program instructions; and
   a plurality of processing elements coupled to the hardware instruction memory, the plurality of processing elements adapted to concurrently initiate execution of k physical threads in response to a broadcast of a first thread enable signal and assign a virtual thread identification to each physical thread, to retrieve the series of spawn-join instructions from the instruction memory, wherein each spawn-join instruction corresponds to a virtual thread and includes a join command to signal termination of the corresponding virtual thread, to execute in parallel and independent of order respective series of virtual threads using the physical threads, to calculate a prefix sum, and when the number of k physical threads is less than the number of n virtual threads, the plurality of processing elements are further adapted to issue a second thread enable signal when at least one join command has been executed, and in response to the second thread enable signal, to commence recurrent execution of the series of virtual threads with a new virtual thread identification prior to termination of all virtual threads of the spawn command.

14. The computing system of claim 13, wherein the first thread enable signal is embodied as a spawn command and wherein the second thread enable signal is embodied as a spawn-recur command.

15. The computing system of claim 13, wherein a selected processing element of the plurality of processing elements is further adapted to calculate the prefix sum based on a terminating thread of the k physical threads and assign the new virtual thread identification as a number based on the prefix sum calculation.

16. The computing system of claim 13, wherein a selected processing element of the plurality of processing elements is further adapted to calculate the prefix sum during execution of a physical thread.

17. The computing system of claim 13, wherein the plurality of processing elements are further adapted, in response to an enable signal, to store respective series of spawn-join instructions in corresponding sections of the hardware instruction memory.

18. The computing system of claim 13, wherein the plurality of processing elements are further adapted to execute a nested spawn instruction during execution of a series of virtual threads.

19. The computing system of claim 18, wherein the plurality of processing elements are further adapted to move a stored series of spawn-join instructions containing the nested spawn instruction and store in its place in the hardware instruction memory a nested series of spawn-join instructions.

20. The computing system of claim 13, wherein the plurality of processing elements comprise a spawn control unit and a plurality of thread control units, and wherein the spawn control unit is further adapted to broadcast the series of spawn-join instructions to the plurality of thread control units for processing k physical threads.

21. The computing system of claim 20, wherein the spawn control unit is further adapted to dynamically allocate the number of the k physical threads for processing load balancing.

22. A hardware memory circuit storing program instructions for a computer system to execute an algorithm having a fixed order of procession, the memory circuit storing program instructions comprising:
   a first plurality of program instructions corresponding to a first portion of the algorithm, the first plurality of program instructions to be executed in a serial mode;
   a second plurality of program instructions corresponding to a second portion of the algorithm, the second plurality of program instructions comprising a parallel code block having n virtual threads, the second plurality of program instructions adapted to control the computer system to transition from the serial mode and commence a parallel mode by broadcasting a first thread enable signal and concurrently initiating execution of k physical threads, each thread having an assigned virtual thread identification; to retrieve from an instruction memory a series of spawn-join instructions wherein each spawn-join instruction corresponds to a virtual thread and includes a join command to signal termination of the corresponding virtual thread; to execute respective series of virtual threads in parallel and independent of order using the physical threads; to calculate a prefix sum; and when the number of k physical threads is less than the number of n virtual threads, to issue a second thread enable signal when at least one join command has been executed, and in response to the second thread enable signal, to commence recurrent execution of the series of virtual threads with a new virtual thread identification prior to termination of all virtual threads of the spawn command.

23. The hardware memory circuit storing program instructions of claim 22, wherein the second plurality of program instructions is further adapted to control the computer system to calculate the prefix sum based on a terminating thread of the k physical threads and assign the new virtual thread identification as a number based on the prefix sum calculation.

24. The hardware memory circuit storing program instructions of claim 22, wherein the second plurality of program instructions is further adapted to control the computer system to calculate the prefix sum during execution of a physical thread.

25. The hardware memory circuit storing program instructions of claim 22, wherein the second plurality of program instructions is further adapted to control the computer system to, in response to an enable signal, store respective series of spawn-join instructions in corresponding sections of the instruction memory.

26. The hardware memory circuit storing program instructions of claim 22, wherein the second plurality of program instructions is further adapted to control the computer system to execute a nested spawn instruction during execution of a series of virtual threads and to move a stored series of spawn-join instructions containing the nested spawn instruction and store in its place in the instruction memory a nested series of spawn-join instructions.

27. A computer-implemented method of programming a computer system to execute an algorithm, wherein a plurality of program instructions correspond to the algorithm and wherein the plurality of program instructions comprises a parallel code block having n virtual threads, the computer-implemented method comprising:

compiling the plurality of program instructions into computer instructions adapted to control the computer system to:

execute in a serial mode a first plurality of computer instructions;

transition from the serial mode and commence a parallel mode by broadcasting a first thread enable signal and concurrently initiating execution of k physical threads of a second plurality of computer instructions, each thread having an assigned virtual thread identification;

retrieve from an instruction memory a series of spawn-join instructions and execute in parallel and independent of order a respective series of virtual threads, wherein each spawn-join instruction corresponds to a virtual thread and includes a join command to signal termination of the corresponding virtual thread and availability to commence execution of a next virtual thread with a next assigned virtual thread identification prior to termination of all virtual threads of the first thread enable signal;

calculate a prefix sum to provide the next assigned thread identification; and perform a plurality of arbitrary concurrent write operations.

28. The computer-implemented method of claim 27, wherein the compiling step further comprises generating corresponding computer instructions adapted to control the computer system to issue a second thread enable signal when at least one join command has been executed and when the number of k physical threads is less than the number of n virtual threads, and to commence recurrent execution of the series of virtual threads with the next virtual thread identification in response to the second thread enable signal.

29. The computer-implemented method of claim 27, wherein the compiling step further comprises generating corresponding computer instructions adapted to control the computer system to provide a plurality of memory accesses substantially in parallel.

30. The computer-implemented method of claim 27, wherein the compiling step further comprises generating corresponding computer instructions adapted to control the computer system to broadcast single program multiple data (SPMD) code.

* * * * *